United States Patent Office 3,825,648
Patented July 23, 1974

3,825,648
FORGING OF RIGID CRYSTALLINE PLASTICS
Kishor M. Kulkarni, Clarendon Hills, Ill., assignor to ITT Research Institute, Chicago, Ill.
Filed July 6, 1972, Ser. No. 269,383
Int. Cl. B29c 1/14
U.S. Cl. 264—322                                    4 Claims

ABSTRACT OF THE DISCLOSURE

A method for defect-free forging of rigid crystalline plastics such as acetal plastics, in which a workpiece blank of preselected volume and temperature is placed between the dies of a die cavity at a preselected temperature, the dies are positioned to contact the blank and subsequently closed at a speed between 0.5 and 10 inches per minute, the die cavity is opened, and the forged article is removed.

---

Figure 1:
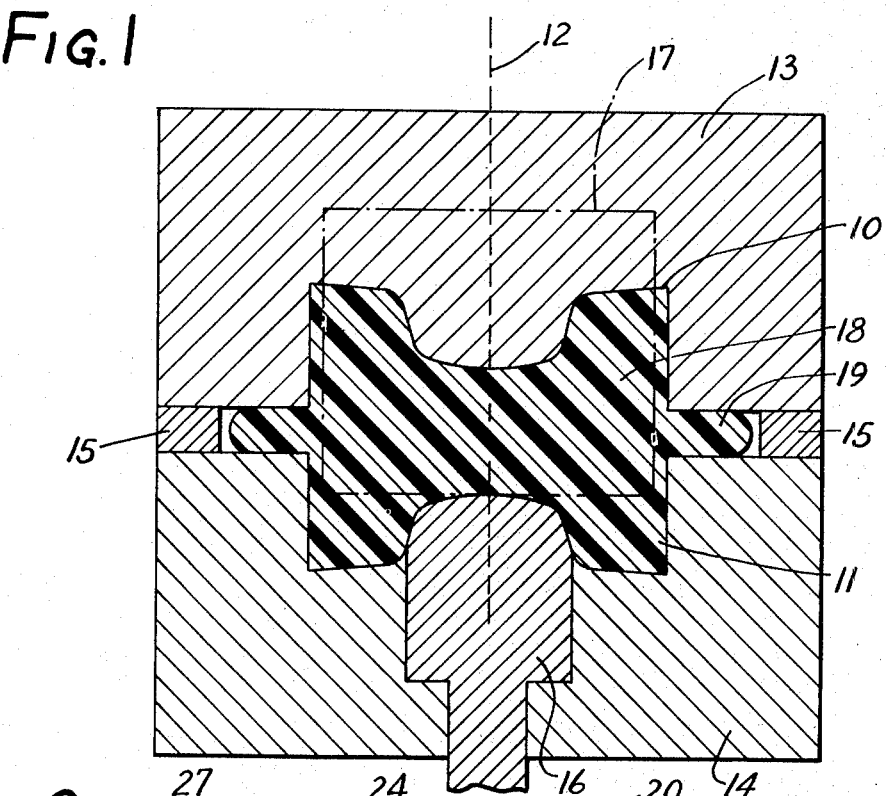

The present invention is directed to the forging of rigid plastic materials, and more particularly is directed to forging processes for the defect-free manufacture of articles of complex, predetermined shape from workpiece blanks of rigid, crystalline, thermoplastics such as acetal polymers.

Conventionally, injection molding is the most important commercial process for production of complex, solid parts from thermoplastic materials. Injection molding requires that molten plastic be forced into a die cavity in which it must thereafter be cooled and solidified before the finished part may be removed. Because plastics are poor conductors of heat, the injection molding cycle time increases rapidly as the part thickness increases and requires a longer time to solidify. For example, for articles of about $3/16$ in. thickness, the injection molding cycle time for one injection molding cycle exceeds about one minute, and generally the injection molding technique becomes uneconomical for articles of greater thickness. In addition, because of the large contraction of the molten, injection molded plastic as it solidifies in the die cavity, the dimensional tolerance of the finished article worsens as the part thickness increases. Furthermore, while the desired mechanical properties of a thermoplastic polymer may increase with increasing molecular weight of the plastic, injection molding requires the plastic to have a relatively low melt viscosity and accordingly may be limited to the lower molecular weight range of the plastic having relatively inferior mechanical properties. These and other inherent limitations of injection molding and other related types of fabrication in which a molten plastic is forced into and solidified in a mold, are well known to those skilled in the art.

The potential advantage of forging techniques for manufacturing shaped plastic articles are also well known, and considerable effort has been expended in the art in an effort to realize these benefits and to develop commercially operable forging processes. Generally, the fabrication of plastics through the use of forging techniques involves placing a room temperature or heated workpiece blank between forging dies in a press, and deforming the workpiece into conformity with the die cavity by direct application of force to the workpiece by means of the dies. Conventional hydraulic presses having a press capacity of 1 to 5 tons per square inch of forming area and a normal closing speed of 15 to 200 inches per minutes are generally considered sufficient for forging of plastics, although accumulators have been used to increase this closing speed as desired. The general concept of forging does not require forcing of molten plastic through narrow channels to fill a die cavity and accordingly is not inherently restricted to the lower molecular weight range of the plastic material. Furthermore, forging does not require solidification in a mold from the molten state, and accordingly forging processes potentially have cycle times which are shorter than the cycle times for injection molding of relatively thick articles, and which are potentially considerably shorter than those of injection molding as article thickness increases. Forging processes potentially also have other general advantages such as better dimensional precision, improvement in certain mechanical properties of the finished article, relatively low tooling cost, and relative ease and rapidity of change-over for new products.

However, despite the known, potential advantages of the application of forging techniques to plastics fabrication, successful commercial use of plastics forging has been relatively limited, and considerable difficulties have been encountered in the development of reliable processes. In this connection, the tendency of the forging technique to produce articles which are cracked, crazed, or have other forging defects has been a problem, and is particularly pronounced when complex forging shapes are involved, and when attempts are made to forge complex articles of rigid, crystalline plastics such as acetal which have low ductility. Commercial forging applications have generally been limited to the forging of high ductility materials, such as high density polyethylene and polypropylene, which are relatively insensitive to these forging difficulties.

However, rigid, crystalline thermoplastics such as acetal are used in numerous applications for which these more ductile materials may not be most suitable, particularly in environments where mechanical strength, stiffness, and fatigue endurance are required. For example, acetal plastics are conventionally used for cams, gears, bearings, housings, plumbing components and various automotive parts. It is also appreciated by those skilled in the art that potential applications for rigid, low ductility plastics such as acetal include various applications conventionally employing cast, nonferrous metals such as brass and zinc, provided suitable fabrication methods could be developed.

However, despite the potential advantages of forging and despite the economical attractiveness of rigid, crystalline thermoplastics such as acetal plastics for uses traditionally employing cast non-ferrous metals, processes for reliably, successfully, and economically forging such materials to provide defect-free articles of complex shape have not been realized commercially.

The difficulty encountered in forging of plastics is generally related to the type of material, the processing conditions, and the complexity of the die cavity as compared with the workpiece blank (i.e., the degree of deformation which must be imposed on the workpiece blank during the forging operation). In this connection, rigid crystalline plastics such as acetal polymers are relatively difficult to forge, so that selection of processing parameters is an important factor in the forging of such materials.

The selection of processing parameters becomes critical to the manufacture of defect-free, forged articles of rigid, crystalline plastices, such as cams, gears and other parts and components of similarly intricate shape, where there is substantial complexity of the forging dies. The forging of such articles would generally involve regularly geometric workpieces, which would be required to undergo severe deformation in order to form such articles, and conventional forging techniques result in articles having various defects such as cracks and other imperfections.

The complexity of a forging die cavity with respect to the workpiece blank, and accordingly the difficulty of successfully achieving the deformation which the workpiece must encounter during the forging operation in order to produce the finished article of the desired shape, may be defined in terms of factors such as the ratio of the surface area of the closed die cavity to the surface area of the original workpiece, the length-to-thickness ratios of portions of the closed die cavity which will form prominent features extending from the body of the forged article, and a material movement factor related to the change in position of plastic material during the forging operation.

The ratio of the surface area of the closed die cavity to the surface area of the workpiece blank is a factor which relates to the general complexity of the forging as a whole, and which takes into consideration the effect of the geometry of the workpiece blank upon the difficulty of the required deformation. As the workpiece blank will ordinarily be of a regularly geometric form, such as would be stamped or cut from thick sheets or extrusions, the surface area of the die cavity to which the workpiece blank will be forcefully conformed will generally be larger than that of the workpiece blank, and the surface area ratio $R_s$ will be an overall measure of the complexity of the system.

An analysis of the complexity of a given forging must also include consideration of the complexity of the forging on a local basis. For example, even if the surface area ratio $R_s$ would be relatively low, the forging may include thin ribs, walls, gear teeth or other prominent features, which would present a local complexity and which would be a limiting factor in the production of defect-free forged articles. The length-to-thickness ratio $R_l$ of such features is a conventional measure of this localized complexity which is employd in the forging art, particularly the metal-forging art. For the purpose of the present invention, $R_l$ refers to the length-to-thickness ratio of that portion of the die cavity which provides the protuberance or other prominent feature of the forged article having the largest length-to-thickness ratio.

A third factor which is useful in defining the complexity of a given forging is the material movement ratio $R_m$, which is a ratio of the distance of the plastic material at a point on the surface of the forged article in the closed die cavity from the center of mass of the forged article, to the distance of the location of the same plastic material in the workpiece blank, measured with respect to the center of mass of the workpiece blank. The ratio $R_m$ represents the maximum such ratio. Ideally the distance for the forged article should be measured along the path of the actual material movement (with reference to the center of mass). In practice, however, such calculations would be extremely difficult and can instead be adequately approximated in most practical situations by more simple measurements or calculations. For example, for many types of axi-symmetric forgings, $R_m$ may be approximated by the ratio of the maximum axial dimension of the die cavity to the maximum axial dimension of the workpiece blank. Engineering judgement may be employed for other suitable approximations of $R_m$ for other types of forgings.

The deformation complexity factor CF of a forging may be defined numerically in terms of $R_s$, $R_l$ and $R_m$ as follows:

$$CF = R_s \times (R_l + R_m)/2$$

The complexity factor CF is defined as being directly proportional to the surface area ratio $R_s$, and to the average of the length-to-thickness ratio $R_l$ and the material movement ratio $R_m$. In this connection, $R_l$, and $R_m$ to a certain extent, are measures of local complexity and their influence may be regarded as being of similar importance, while their collective influence may be regarded as being of similar proportional importance to the surface area ratio $R_s$.

Forging having a complexity factor CF of about 1.5 or more, or more particularly about 3.0 or more, are difficult to manufacture in defect-free condition from rigid crystalline plastics such as acetal polymers.

Accordingly, it is an object of the present invention to provide a relatively simple method for forging rigid crystalline thermoplastic materials such as acetal plastics, which will reliably and economically produce defect-free articles of relatively complex shape from regularly geometrical workpiece blanks.

Figure 2:
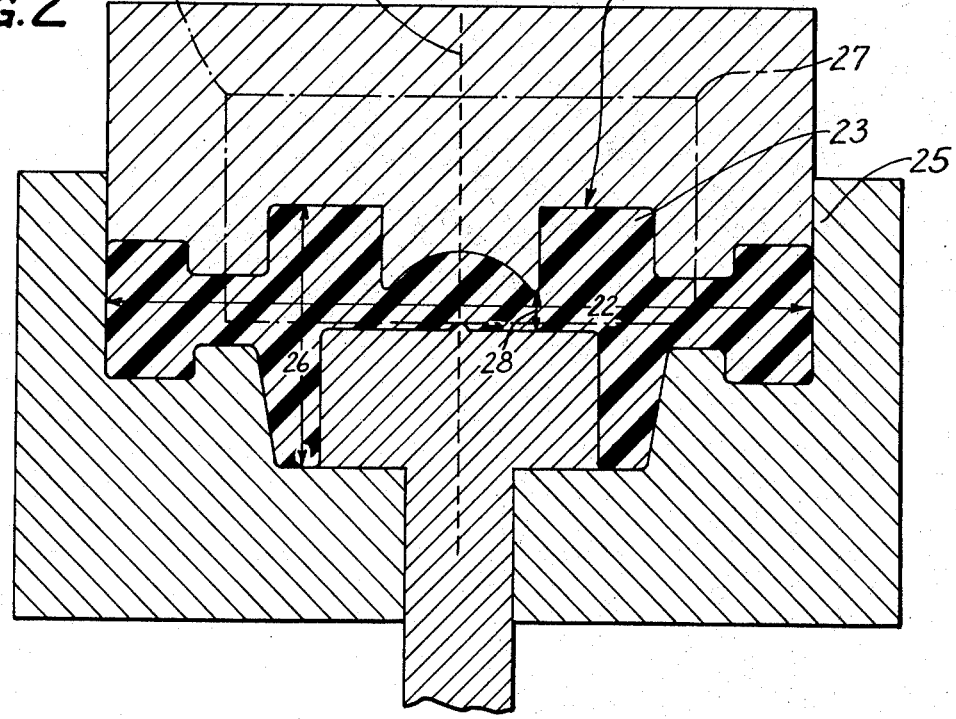

These and other objects of the invention are more particularly set forth in the following detailed description and in the accompanying drawings of which FIG. 1 is a side view in cross section of a closed die cavity enclosing a relatively simple article, with accompanying flash, and FIG. 2 is a side view in cross section of a closed die cavity enclosing a relatively complex article forged in accordance with the method of the present invention.

Generally, the present invention is directed to a method for the manufacture, by forging techniques, of complex articles of predetermined shape from workpiece blanks of rigid, crystalline, organopolymeric thermoplastic material such as acetal plastic. In the method, a workpiece blank of the thermoplastic material is provided which has a preselected mass and shape, and which is at a preselected forging temperature in the range of from about 75° F., and preferably from about 50° F., below the crystalline melting temperature of the plastic to about the crystalline melting temperature of the plastic. The workpiece blank at this forging temperature is placed between the dies of a die cavity having a predetermined shape in closed position of the dies, relating to the shape of the article to be manufactured. The die cavity includes two opposed dies which are axially movable with respect to each other to open and close the die cavity. The die faces are normally made of a mechanically suitable metal and are maintained at a preselected temperature during the forging operation in the range of from about 75° F., and preferably from about 50° F., below the crystalline melting point of the rigid crystalline plastic to about the crystalline melting temperature of the plastic. After the workpiece is inserted between the die faces of the open die cavity the die faces are positioned, by closing, into initial contact with the opposite sides of the workpiece. After the die faces are positioned into initial contact with the workpiece blank, the die faces are closed together under pressure at a predetermined closing speed until the die cavity is in a closed position so that the workpiece is forged into conformity with the closed die cavity. The complexity factor CF for the die cavity-workpiece blank system will generally be about 3.0 or more.

The relationship between the temperature of the workpiece, the temperature of the die faces, and the closing speed of the die faces during forging is critical to the production of defect-free forgings of complex shape from rigid crystalline polymers such as acetal plastics. In this connection and in combination with the specified workpiece and die face temperature, it is important that the closing speed of the die faces with respect to each other be maintained at a speed of from about 0.5 inches per minute to about 10 inches per minute during the forging process, after the initial contact of the die faces with the workpiece and until the die faces are in closed position.

At the completion of the compression step, as the dies approach the closed position and as the workpiece is being forced into full conformity with the die cavity, the closing speed V of the dies should not exceed the quantity determined by the following formula:

$$V = \frac{150 \times L}{e^{CF}}$$

where V is given in inches per minute, and L is the maximum dimension, in inches, of the original workpiece blank in the open die cavity, in a direction parallel to the axis of movement of the dies, and $e$ is the base of the natural logarithm.

More specifically, the complexity factor CF may be regarded as a dynamic quantity throughout the compression step, with $R_s$ being the ratio of the surface area of the partially deformed workpiece to the surface area of the original workpiece blank, with $R_l$ being the length-to-width ratio of the partially formed protruberance having the maximum such ratio, and with $R_m$ being the material movement factor calculated for the partially deformed workpiece with respect to the original workpiece blank. The closing speed V of the dies should not exceed the quantity calculated from the above formula, for the dynamic quantity CF during a given stage in the compression step. After reaching their closed position, the die faces may be maintained in closed position for a limited amount of time to permit stress relaxation of the formed article in the closed die cavity. The die faces may then be opened, and the finished defect-free forged article thus produced may be removed.

The rigid crystalline thermoplastics which are beneficially forged through the use of the present method are low ductility materials having a elongation of less than about 75 percent when measured in accordance with A.S.T.M. test method D1708. Moreover, the materials have a relatively high flexural modulus of at least about $3.00 \times 10^5$ p.s.i., and preferably about $3.75 \times 10^5$ p.s.i. or more when measured in accordance with A.S.T.M. test method D709, and a high compressive strength in excess of about 10,000 p.s.i., and preferably at least about 15,000 p.s.i. (10% deflection) when measured in accordance with A.S.T.M. test method D695.

The rigid thermoplastics are crystalline materials and accordingly have a relatively sharp melting range at the crystalline melting temperature. The crystalline melting temperature is generally above about 200° F. Acetal homopolymers and copolymers are primary examples of this class of rigid, crystalline materials. The present invention has particular utility in the forging of acetal homopolymer, which has higher crystallinity and which presents more forging difficulties in connection with conventional forging processes than do the acetal copolymers.

In order to further illustrate the present method, two series of forgings of acetal homopolymer workpiece blanks are made using two differently shaped die cavities, which are illustrated in FIGS. 1 and 2, respectively. The data for the series of forgings using the die cavity of FIG. 1 is set forth in Table I, and the data for the series of forgings using the die cavity of FIG. 2 is set forth in Table II.

The die cavity 10 of FIG. 1 illustrated in cross sectional side view is a relatively simple die cavity which is designed to provide a circularly symmetrical forging with a volume of approximately 4 cubic inches and a longitudinal cross section similar to the letter H. The die cavity 10 is generated by rotation of the indicated cross section about the axis 12. The die cavity is formed by two mated, opposed dies 13,14 which are machined from mild steel. The mild steel has adequate mechanical properties for acetal forging. The dies forming the die cavity 10 open and close along axis 12.

A stop ring 15 separates the dies 13, 14 and determines the end of the compression stroke. When both of the dies 13, 14 are in contact with the stop ring 15, the dies are in closed position. An ejection ram 16 forms part of the bottom die 14, but is selectively operable upon opening the die cavity 10 to eject the finished article.

The article 11 formed in the closed die cavity 10 may be regarded as being composed of two portions, a central body 18, and a circumferential flash ring 19. The central body 18 itself is quite simple, while the central body 18 considered together with the circumferential ring 19 is more complex in terms of the original workpiece. The drawing of the forged article 11 is proportionally accurate.

The second die cavity 20 illustrated in FIG. 2, is designed to provide a gear-shaped article 21. The cavity 20 has a diameter 22 of 5 inches and has a volume of about 17 cubic inches. The die cavity 20 is illustrated in cross section and is generated by rotation of the indicated cross section about axis 24. The axis 24 is also the axis of travel of the dies in the forging operation.

The die cavity 20 is also formed by two mated, mild steel dies 23, 25 which in closed position define the cavity 20. The drawing of the forged article 21 in the closed die cavity 20 of FIG. 2 is proportionally accurate, and it can be readily observed that the die cavity involves considerable variation in section thickness, longitudinally of the axis of travel 24 of the dies forming the cavity. The longitudinal cavity thickness ranges from a central hub thickness 26 (i.e., maximum axial length) of 1⅞ inches, down to a thin central section thickness 28 (i.e., minimum axial length of ¼ inch).

Thus while the central body 18 of the article 10 of FIG. 1 is relatively simple, the die cavity 20 of FIG. 2 is quite complex, requiring severe deformation of a workpiece blank, and is accordingly a substantially more appropriate die cavity for illustration of the benefits of the present method.

The acetal homopolymer workpiece blanks 17, 27 for the die cavities 10, 20 have a preselected volume which is about equal to the volume of the die cavity, and the volume of the finished article produced by the forging process. The workpiece blanks 17 for the cavity 10 of FIG. 1 are solid, cylindrical bodies having a volume of about 4 cubic inches, a height of about 1.62 inches, and a diameter of about 1.75 inches. The workpiece blanks 27 for the cavity 20 of FIG. 2 are solid cylindrical bodies having a volume of about 17 cubic inches, a diameter of 3.5 inches and a height of 1.75 inches. An outline of the position of the cylindrical workpiece blanks 17, 27 when placed on the lower die face 14, 25 of the respective die cavity 10, 20 prior to forging is also shown in cross section in FIG. 1 and FIG. 2 by dotted lines. The outlines of the workpieces are also proportionally to scale. It can be seen that severe deformation of the workpiece 27 is required to conform it to the die cavity 20, while only modest deformation of the workpiece 17 is required in the cavity 10, at least in with respect to the formation of the central body 18 of the article 11.

The present method is particularly adapted for making articles having a volume greater than about three cubic inches, as well as a minimum thickness longitudinally of the forging axis which is greater than 0.2 inch throughout the article, with the exception of holes or other openings.

Suitable workpiece blanks may be provided in any appropriate manner, and the workpiece blanks will generally be of some regular, geometrical shape which is easy and economical to manufacture, and which has a projected area such that it may be inserted between the open dies of the die cavity. Stamping or cutting of workpieces from extruded forms such as extruded sheet, cylinders or other shapes is an economical way to provide the workpieces.

The workpiece blanks are heated to a preselected forging temperature, which in the present method must be in the range from about 75° F., and preferably from about 50° F., below the crystalline melting temperature, to the crystalline melting temperature of the acetal plastic. More preferably, the blanks will be heated to a temperature in the range between about 30° F. below the crystalline melting point to about 5° F. below the crystalline melting point. If the workpiece is at a temperature below this range, defect-free forgings will generally not be provided. On the other hand, while the temperature of the workpiece blank may be approximately the crystalline melting temperature of the plastic, no substantial melting of its crystalline structure should take place, or the advantages of the forging technique will be lost and the acetal will have to be cooled and solidified in the mold.

As a practical matter, to avoid the possibility of melting the workpiece, the workpiece should be heated to a temperature which is less than about 5° F. below the crystalline melting point of the plastic. The workpiece blanks may be heated in any suitable manner, such as by means of an oven or by infrared radiation. For example, in the two series of runs conducted with die cavities 10, 20 the workpieces are placed in a circulating air oven maintained at the desired temperature, for a time period sufficient to uniformly heat the workpiece to the oven temperature. Alternatively, the workpieces may be cut from heated, extruded bodies and maintained at the proper temperature until they are forged. The temperature of all parts of the workpiece should be in the preselected temperature range, and the entire workpiece should best be at a relatively uniform temperature (e.g., ±15° F. throughout the workpiece).

In two series of runs conducted with the die cavities 10, 20 of FIGS. 1 and 2 and represented in Tables I and II, the respective die sets forming the die cavities 10, 20 are mounted in a 75-ton hydraulic press capable of press speed of up to about 600 inches per minute. A pressure gage mounted on the press provides measurement of the load during during the forging operation. A linear voltage differential transformer-type position transducer is incorporated in connection with each of the die sets so that the distance between the dies may be continuously recorded as a function of time on a chart recorder, and so that the closing speed of the dies may be measured and controlled.

After being heated to the temperatures indicated in Tables I and II, for each of the indicated runs the heated workpiece blank is placed between the open dies in the hydraulic press.

The metal dies faces are also at the temperature specified in the Tables I and II for the indicated run. It is noted that because some thermal energy may be generated within the workpiece during the forging operation, because of temperature control considerations, and in order to avoid the possibility of surface melting of the workpiece, the die faces should preferably be at a temperature lower than about 5 degrees F. less than the crystalline melting temperature of the acetal plastic. In order to process the workpiece blanks in accordance with the present method, the die faces should be maintained in the previously specified preselected temperature range throughout the time that the dies are in contact with the workpiece. Although the temperature may vary within this range during a given run, it is preferred that the temperature of the dies remain relatively constant. In this connection, and particularly for continuous automatic production, the dies may be provided with suitable heating and cooling means such as electrical resistance heaters, or coils for heating or cooling fluids. The temperature of the dies should best be somewhat lower than the temperature of the workpiece, and preferably should be maintained throughout the time they are in contact with the workpiece at a temperature which is between about 5° F. and about 15° F. lower than the temperature of the workpiece at the time it is inserted between the dies.

After the heated workpiece blanks are inserted between the heated dies in the press, the dies are positioned into initial contact with opposite sides of the workpiece by closing the press. The press may be closed so that the dies come into initial contact with the workpiece, at a speed which is unrelated to the compression speed which must subsequently be maintained during deformation of the blank. However, the initial press closing speed will generally be at least equal to the subsequent compression closing speed and advantageously may be substantially greater than the subsequent compression closing speed. In this connection, in order to permit insertion of the workpiece blank between the dies or in the normal operation of the press, it may be necessary to open the press a distance which may be up to several inches or more greater than the thickness of the workpiece blank, and the time required to close the dies this additional distance is reflected in the cycle time of the forging process. When this additional distance is substantial, the cycle time of the present process may be significantly improved by closing the dies into initial contact with the workpiece at a relatively high speed, preferably greater than about 10 inches per minute, and more preferably greater than about 50 inches per minute.

In accordance with the skill of the mechanical arts, the press may be provided with an appropriate control mechanism to achieve rapid die closing to initial contact, while providing the proper speed control after initial contact.

After the heated dies have been positioned into initial contact with the acetal workpiece, the dies are closed together at a predetermined speed to compress the workpiece into conformity with the die cavity. In order to insure defect-free forgings in accordance with the present invention, the predetermined compression closing speed of the dies must be from about 0.5 inches per minute to about 10 inches per minute. This speed, in combination with the other steps of the present method, is a critical control criterion for the reliable and economical manufacture of complex, forged articles of acetal plastics. The specified compression closing speed must be maintained in the stated range until the dies are in the closed position to form the final die cavity. For the more complex dies and die cavities requiring substantial distortion of the original workpiece, the maximum closing compression speed will be a dynamic quantity which will decrease during the compression step as the calculated complexity factor CF for the partially deformed workpiece increases, as described hereinabove. Thus, for a die cavity-workpiece blank system having a complexity factor CF of about 4.5, the maximum compression closing speed may be about 10 inches per minute at the beginning of the compression step, but decreases to a value which is less than about 3 inches per minute at the end of the compression step.

After the dies have been compressed to their closed position, it is generally desirable that the dies be maintained in this closed position for a limited stress relaxation period to provide form stability of the forged article, and to insure accurate conformity with the die cavity. This stress relaxation period will ordinarily be between about 5 and about 20 seconds, but might be as long as 60 seconds. Thereafter, the dies may be opened, and the finished, defect-free forging removed.

The finished article may thereafter be subjected to post-forging treatment, if desired, such as crosslinking by radiation or chemical surface treatment, or tempering at a specified temperature to control reversion to the pre-forged shape at elevated temperatures, as well as surface coating, plating, and other decorative effects.

The following Table I presents data from a series of runs which are conducted with the dies 13, 14 of the die cavity 10 in the aforementioned hydraulic press. As the die set of the die cavity of FIG. 1 is relatively small, and as a limited number of non-production type runs are to be made, the dies 13, 14 are conveniently heated to the temperature indicated in Table I by means of a gas torch directed into the die cavity 10. Preparatory to each run, the dies are lubricated by spraying Teflon-based fluid on them to leave a thin residue of Teflon lubricant on the dies. The workpiece blanks for the respective runs are heated to the indicated temperature in an air-circulated oven and are transferred manually to the press for the forging operation. For the runs of Table II, the two inch per minute closing speed is manually controlled by visually monitoring the press speed and adjusting the hydraulic pressure to maintain the desired average closing speed. Automatic speed control would be employed for continuous production. The dies of the die cavity 10 are in closed position when the upper die comes in contact with the stop ring 15 between the dies 13, 14. The data for these runs is as follows:

TABLE I

| Run number | Work-piece temp., °F. | Die temp., °F. | Forging pressure, p.s.i. | Duration of load, sec. | Compression closing speed | Quality of forged article |
|---|---|---|---|---|---|---|
| 1 | 220 | 215 | 5,040 | 0-5 | 80 inches/minute | Flashrings defective. |
| 2 | 225 | 240 | 5,360 | 30 | do | Do. |
| 3 | 275 | 260 | 3,710 | 0-5 | do | Do. |
| 4 | 275 | 255 | 4,040 | 30 | do | Do. |
| 5 | 275 | 245 | 4,920 | 30 | do | Do. |

$R_s=1.16^*$; $1.66^{**}$
$R_l=1.05^*$; $2.3^{**}$
$R_m=1.0^*$; $1.53^{**}$
$CF=1.19^*$; $3.18^{**}$
$V=74$ i.p.m.$^*$, $10.1$ i.p.m.$^{**}$

*Calculated for the central body 18 of the forged article 11 without the circumferential ring 19.
**Calculated for the forged article 11 including the circumferential ring 19.

The indicated forging pressure data is read from the pressure gage on the press, and represents a maximum figure. The indicated compression closing speed is maintained from the time of initial contact of the dies with the workpiece to the time the dies become seated against the stop ring by manual adjustment of the hydraulic pressure of the press in response to the chart-recorded speed. The manual adjustment results in some periodic short-interval (on the order of about a second) deviation from the indicated closing speed. This short-interval deviation is immaterial to the practice of the method. The duration of load is measured from the time the dies become seated against the stop ring.

The indicated values of $R_s$, $R_l$, and $R_m$ are calculated for both the case of the central body 18 of the forged articles above, and for the case of the forged articles including the circumferential flash ring 19. These values are based on dimensions of the forging after removal from the dies, but would not differ substantially from values on the die cavity. $R_s$ represents the ratio of the entire surface area of the forging (with or without the flash ring 19) to the entire surface area of the original blank. $R_l$ is calculated in accordance with conventional metal forging practice, and for the case of the forging without the flash ring, represents the maximum $R_l$ value for a prominent protrusion or other feature of the forging. Because of the simplicity of the article when considered without the flash ring, the only prominent protrusions are the circularly symmetrical, interiorly flared ridges formed at each longitudinal end of the article. These ridges have a length (or height) from the articel body determined by the depth of the center depression, and a width determined by measuring the base of a representative cross section which in the present case is orthogonal to the sides of the article to minimize the cross sectional area, and which includes the line of measurement of the length of the protrusion. It should be noted that $R_l$ should always be at least 1, if the width measurement (generally taken parallel to the base of its protuberance at the body of the article) is larger than the length measurement (generally taken perpendicular to the width measurement), $R_l$ should be assumed to be unity for the purposes of the present method.

For the case of the forged article with the flash ring, the $R_l$ value for the flash ring (having a length measured extending radially from the longitudinal side of the article, and a width measured parallel to the longitudinal axis and at the side of the article) and accordingly determines the $R_l$ value for this case. The respective $R_m$ values are approximated by the ratio of the forged diameters to the diameter of the original blank.

All of the runs of Table I with a compression closing speed of 80 inches per minute and each of the runs has, to some degree, forging defects associated with the circumferential flash ring while the central bodies of the forging are of acceptable quality. This result is predictable in accordance with the calculated values for V based on the value determined for CF for the article with, and without, the flash ring.

The data for a series of runs employing the dies of the relatively complex die cavity 20 and the cylindrical acetal workpieces illustrated in FIG. 2, is set forth in Table II. The dies of the die cavity 20 are heated in closed position by mounting an electrical strip heater around the lower die and monitoring the power input to the heater. In addition, in order to measure the forging pressure without the influence of the dies coming in contact, the compressive load is controlled by appropriate setting of a pressure-regulating valve and the compression stroke is stopped, and the dies considered to be in closed position, when a gap of about 1/16 inch remains between the dies. The data for the series of runs, which are otherwise carried out like those of Table I, is set forth in Table II as follows:

TABLE II

| Run number | Work-piece temp., °F. | Die temp., °F. | Press speed, i.p.m. | Duration of load, sec. | Forging pressure, p.s.i. | Forging diameter x maximum axial length after removal from die, in. | Remarks |
|---|---|---|---|---|---|---|---|
| 1 | 250 | 250 | 6 | 120 | 7,600 | 4.80 x 1.8 | Split laterally. |
| 2 | 325 | 325 | 6 | 30 | 7,600 | 4.430 x 1.85 | Melted surface. |
| 3 | 325 | 225 | 6 | 30 | 7,600 | 4.730 x 1.8 | Tearing at surface. |
| 4 | 325 | 300 | 2 | 30 | 2,000-7,600 | 4.780 x 1.78 | Edges melted, no tensile cracks on surface. |
| 5 | 325 | 275 | 2 | 30 | 2,000-7,600 | 4.830 x 1.67 | Excellent forging. |

$R_s=2.11^*$
$R_l=2.8^*$
$R_m=1.43^*$
$CF=4.43^*$
$V=3.1^*$

*Calculated with respect to the dimensions of the die cavity.

The $R_s$ value represents the ratio of the interior surface area of the closed die cavity to the surface area of the workpiece blanks. The $R_l$ value is calculated for the circularly symmetrical portion of the die cavity which forms the cylindrical rib-wall feature extending from the bottom of the forging. The length of this feature is measured parallel to the longitudinal axis, and the width is measured from the base of this feature where it joins the remainder of the article, along a line extending radially from the longitudinal axis. $R_m$ is approximately by the ratio of the diameter of the forged article to that of the workpiece blank.

The data of Table II indicates the importance of slow compression press speeds in combination with other process conditions for the forging of defect-free, complex articles involving severe workpiece deformation. Accordingly, a method has been provided for the reliable and economical defect-free forging of rigid, crystalline plastics such as acetal.

Various modifications or alterations of the process may become apparent to those skilled in the art in view of the present disclosure, such as the use of mineral-filled or reinforced acetal workpiece blanks. While the method has been described with particularity for acetal plastic, the method is also useful for other rigid, low ductility crystalline plastics such as various crystalline stereoregular addition polymers (e.g. isotactic polystyrene, melting point 464° F.). Various approaches to effect automation of the present method will also become apparent to those skilled in the art.

Various of the features of the present invention are set forth in the following claims.

What is claimed is:

1. A method for the defect-free manufacture by forging of an article of predetermined complex shape from a workpiece blank of rigid, crystalline, low ductility organopolymeric thermoplastic material having an elongation of less than about 75 percent, a flexural modulus of at least about $3.00 \times 10^5$ p.s.i. and a compressive strength of at least about 10,000 p.s.i., comprising, in combination, the steps of providing a workpiece blank of rigid, crystalline organopolymeric material of preselected shape and volume greater than about 3 cubic inches at a preselected forging temperature in the range from about 30° F. below the crystalline melting temperature of said material to about 5° F. below said crystalline melting temperature, placing said workpiece blank at said forging temperature between the dies of an open die cavity having predetermined shape in closed position relating to the shape of the article to be manufactured, said cavity comprising two opposed dies axially movable with respect to each other to open and close said die cavity, said dies being at a preselected temperature in the range of from about 75° F. below the crystalline melting point of said material to a temperature less than said preselected forging temperature of said workpiece blank, positioning said dies, with said workpiece therebetween, into initial contact with opposite sides of said workpiece, subsequent to said positioning of said dies into initial contact with said workpiece, closing said dies together under pressure at a predetermined closing speed until said mold cavity is in a closed position such that said workpiece is forged into conformity with said closed die cavity, maintaining said predetermined closing speed of said dies with respect to each other at a speed between about 0.5 inches per minute and about 10 inches per minute, wherein said closing speed V is not permitted to exceed the quantity $150L/e^{CF}$ from the time of initial contact of the dies with the workpiece, where L is the maximum dimension in inches of said workpiece blank in the open die cavity in a direction parallel to the axis of movement of the dies, and CF is a dynamic complexity factor defined as:

$R_s \times (R_l + R_m)/2$, where $R_s$ is the surface area ratio of the deformed workpiece to the original workpiece, $R_l$ is the length-to-thickness ratio of the original workpiece to the deformed workpiece, and $R_m$ is the material movement factor measured with respect to the center of mass of the workpiece blanks, maintaining the dies in closed position for a period of time from about 5 to about 60 seconds, opening said cavity, and removing the defect-free forged article from said cavity.

2. A method in accordance with Claim 1 wherein said organopolymeric material is acetal homopolymer.

3. A method in accordance with Claim 2 wherein the die cavity-workpiece blank system has a complexity factor of about 3.0 or more at completion of the compression step.

4. A method in accordance with Claim 3 wherein the temperature of the dies is maintained at a temperature between about 5° F. and about 15° F. lower than the temperature of the workpiece at the time it is inserted between the dies.

References Cited

UNITED STATES PATENTS

| 3,562,383 | 2/1971 | Ayres | 264—322 X |
| 3,492,387 | 1/1970 | Larson | 264—296 X |
| 3,171,350 | 3/1965 | Metcalf | 264—323 X |

OTHER REFERENCES

Werner, et al.: Forging High Molecular Weight Polyethylene. SPE Journal, December 1968, vol. 24, pp. 76–79 relied on.

ROBERT F. WHITE, Primary Examiner

R. R. KUCIA, Assistant Examiner

U.S. Cl. X.R.

264—294, 295, 325

UNITED STATES PATENT OFFICE
CERTIFICATE OF CORRECTION

Patent No. 3,825,648          Dated July 23, 1974

Inventor(s) Kishor M. Kulkarni

It is certified that error appears in the above-identified patent and that said Letters Patent are hereby corrected as shown below:

In the heading to the printed specification line 4, "ITT Research Institute" should read -- IIT Research Institute --.

Signed and Sealed this

Twenty-seventh Day of June 1978

[SEAL]

Attest:

RUTH C. MASON
*Attesting Officer*

DONALD W. BANNER
*Commissioner of Patents and Trademarks*